Feb. 15, 1966 G. M. WHITE 3,235,844

ADAPTIVE SYSTEM

Filed Feb. 8, 1960 3 Sheets-Sheet 1

Inventor:
Gerald M. White,
by Richard R. Brainard
His Attorney.

Inventor:
Gerald M. White,
by Richard R. Brainard
His Attorney.

ADAPTIVE SYSTEM

Filed Feb. 8, 1960 3 Sheets-Sheet 3

Inventor:
Gerald M. White,
by Richard R. Brainard
His Attorney.

United States Patent Office 3,235,844
Patented Feb. 15, 1966

3,235,844
ADAPTIVE SYSTEM

Gerald M. White, Schenectady, N.Y., assignor to General Electric Company, a corporation of New York Filed Feb. 8, 1960, Ser. No. 7,275
22 Claims. (Cl. 340—172.5)

The present invention relates to a system for recognizing and storing a plurality of unknown signals which may be continuously changing and which may be distorted by noise.

One of the problems confronting the present day designer of electrical systems is that the system will only recognize a signal whose characteristics are known in advance. For example, present day digital computers are capable of handling only that information which is inserted into the computer in the form of a predetermined pattern or wave form. As another example, communication systems are designed to recognize the reception of a certain predetermined signal. If the characteristics of this signal are altered, present day communication systems are ineffective. There are many applications where it would be desirable to have a system which would recognize what is significant in its environment even though the type or quality of signals which may be significant is not fully known before hand. In addition, there are many applications where it is desirable to classify signals in accordance with the characteristics of the signals.

In accordance with the present invention, such a system, which may conveniently be called an adaptive system, is provided. The system stores particular signals which are contained in the input to the system. Subsequently received inputs are compared with the contents of storage. If there is coincidence between subsequently received inputs and the contents of storage, the subsequently received inputs are inserted into storage in a manner which takes into account the number of times the particular signal has been received and the amount of time between successive receptions of the signal.

Accordingly, it is an object of the present invention to provide a system which will recognize and store signals whose characteristics are not known beforehand.

It is another object of the present invention to provide a system which will recognize and store signals which may be buried in noise.

It is a further object of the present invention to provide a system which will recognize and store signals which may be continuously changing in wave shape.

It is a further object of the present invention to provide a system which will classify signals in accordance with their characteristics even though these characteristics are not known beforehand.

In carrying out my invention in one form thereof, there are provided a plurality of what may be termed adaptive channels, each of which is capable of recognizing and storing one of a plurality of signals which are received. The input, which may contain many different signals and noise, is fed to these channels in such a manner that each channel recognizes and stores one particular signal. Each channel has a storage register in which signals may be stored. Initially, the input is sampled and a different portion of the input is stored in the storage register in each channel. This may be referred to as the priming phase of the operation of my system. A priming commutator is provided for initially priming each of the channels of the system.

During the second phase, which may be referred to as the steady state phase of the operation of my system, the input is continuously compared with the contents of storage of each channel. In order to accomplish this a coincidence circuit is provided in each channel for comparing the input with the contents of storage of that channel. If there is a coincidence between a particular signal contained in the input and the contents of storage of that channel, the particular signal will be inserted into the storage register of that channel. The particular signal is added to the contents of storage of the channel in a weighted manner so that the most recently received signal is more important than previously received signals in determining the nature of the contents of storage. By adding together, in the storage register of each channel, all similar signals which occur, the random noise will tend to cancel out and the contents of storage of each channel will become indicative only of the one particular signal which is being repetitively received and stored by that channel. By weighting the information stored in each channel in favor of the most recently received signals the channel will adapt itself to signals which are continuously changing.

During a third phase of the operation of my system, which may be referred to as the examination phase, the contents of storage of each of the channels is compared with the contents of storage of the other channels to determine whether two channels are possibly recognizing and storing the same signal. To accomplish this examination circuits are provided which compare the contents of storage of all channels to determine if there is a coincidence between the contents of storage of any two channels. In such a case the contents of storage of one of the channels will be transferred to the other channel and the first channel is cleared to receive and recognize a different signal.

As the operation of the system progresses the contents of storage of each channel provide a better definition of a particular signal being recognized. Since each channel recognizes and stores a signal having particular characteristics there is a classification of signals in accordance with their characteristics even though these were unknown beforehand.

A better understanding of my invention, together with further objects and advantages thereof, will be better understood from a consideration of the following description taken in connection with the accompanying drawings in which the FIGURE 1 is a block diagram of the primer and the parallel channels with one channel being shown in detail in block form.

Figure 1:
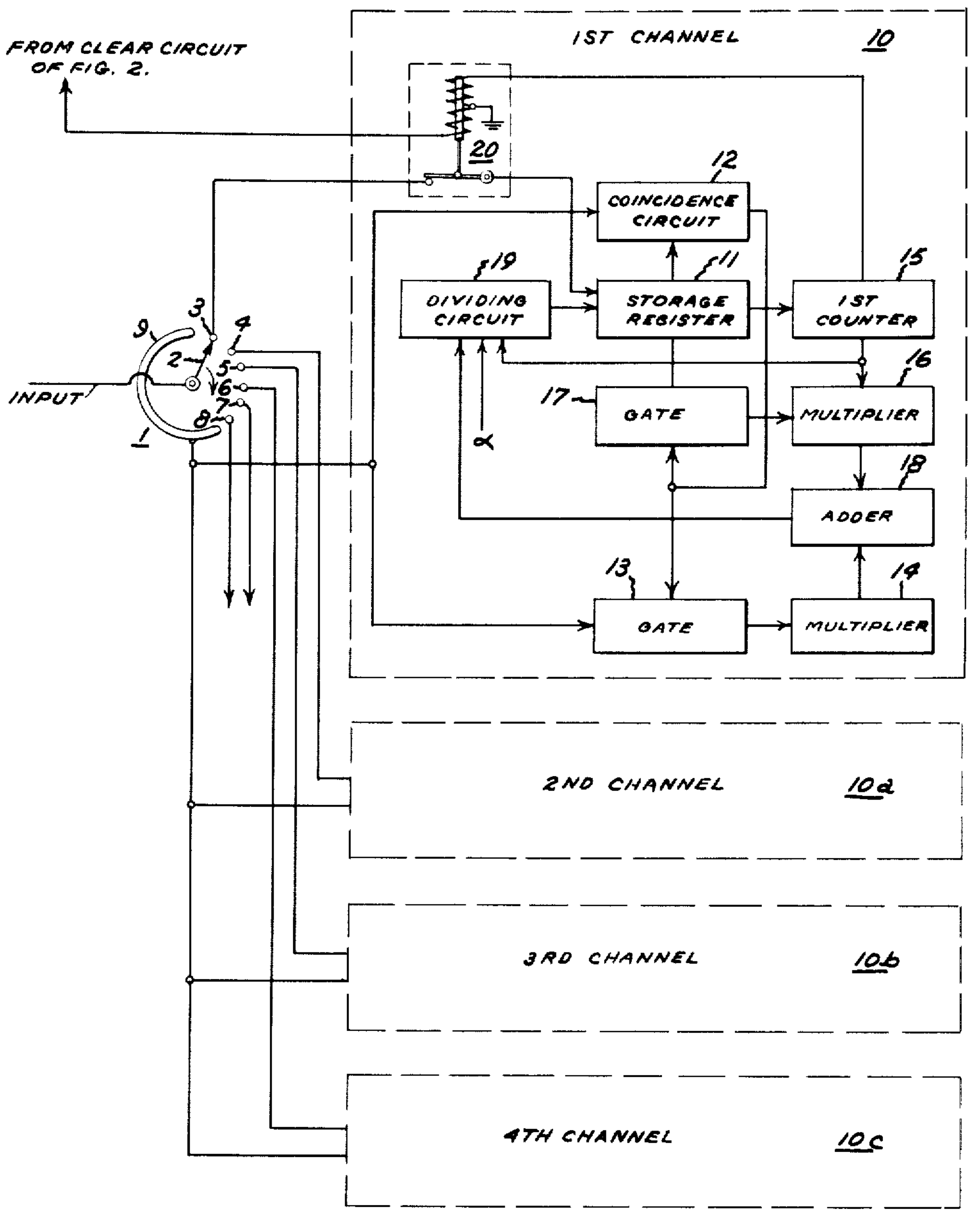

Referring to FIGURE 1, the input containing the plurality of signals and possible noise is fed to a priming commutator 1 which is conveniently shown as being of the mechanical type although any well known type of electronic switching device could be employed. This commutator performs the function of priming the various channels and of switching from the priming phase to the steady state phase of operation. The input is connected to a rotor 2 of the commutator 1. This rotor rotates continuously, thus successively connecting the input to priming positions 3, 4, 5, 6, 7 and 8, and to a steady state position 9. The priming commutator 1 feeds the input to a number of separate channels 10, 10*a*, and 10*b*. Only the first channel, 10, is shown in detail in FIGURE 1.

Figure 2:
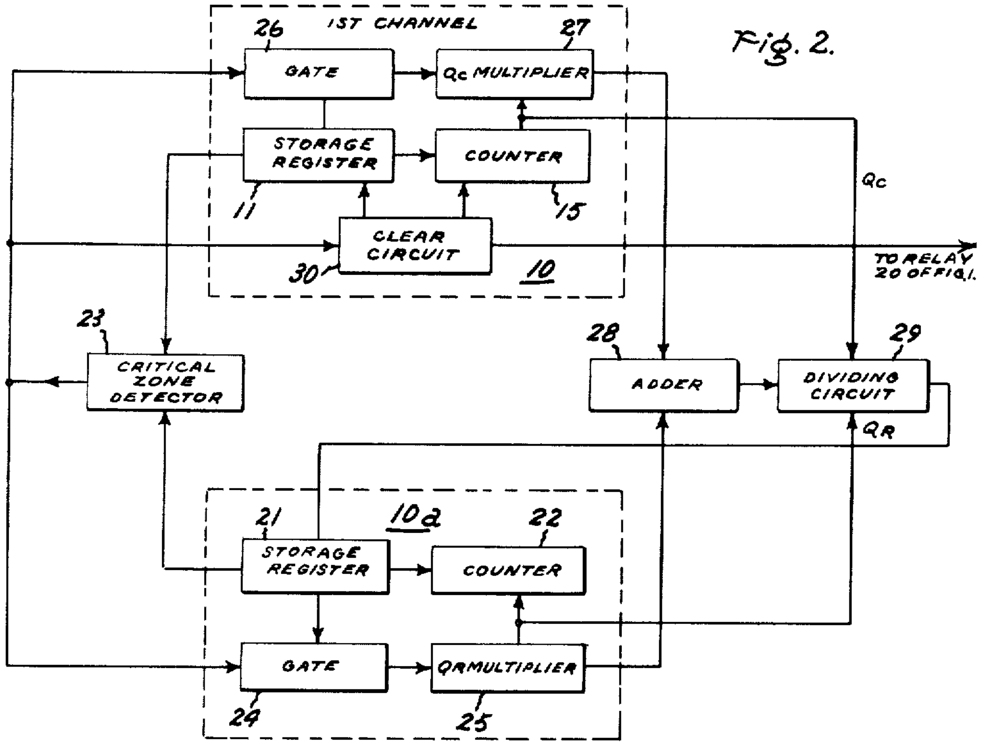
FIGURE 2 is a block diagram of an examination circuit which interconnects two of the channels.

Although I have shown the detail of the adaptive channels only in block form, all of the circuits contained therein are well known in the art or are hereinafter described. Typical circuits which may be used as the adders, dividers, and multipliers shown in block form in FIGURES 1 and 2 are found in texts such as "Introduction to Electronic Analogue Computers," McGraw-Hill, 1955 or "System Engineering," Goode and Machol, McGraw-Hill, 1957. In addition to these analog circuits, the adaptive channels may be implemented using digital techniques which are well known in the art.

Each channel has a storage register; the storage register in the first channel being designated by the numeral 11. The priming position 3 is connected to the storage register 11 so that when the rotor 2 momentarily passes the priming position 3, a portion of the input will be directly inserted into the storage register 11, where, for purposes of definition, it may be called a stored standard. This storage register may be of a type well known in the art such as a storage tube, transistor or a storage capacitor register. In an actual embodiment of the subject invention, storage capacitors were used in the storage registers. As the rotor 2 of the priming commutator 1 continues its clockwise rotation, it will successively prime channels 10*a*, 10*b*, 10*c* and subsequent channels. When the rotor 2 reaches the steady state contact position 9, the input information will be fed to all of the channels.

In order to determine, during the steady state phase of operation, if signals in the input are the same as the contents of storage of the first channel, the steady state contact position 9 is connected to a coincidence circuit 12. The storage register 11 is also connected to the coincidence circuit 12 so that the coincidence circuit 12 will produce an output if the contents of storage are approximately the same as any particular signal contained in the input. The coincidence circuit 12 may be of any type well known in the art which will detect a relative coincidence between two similar wave forms.

Figure 3:
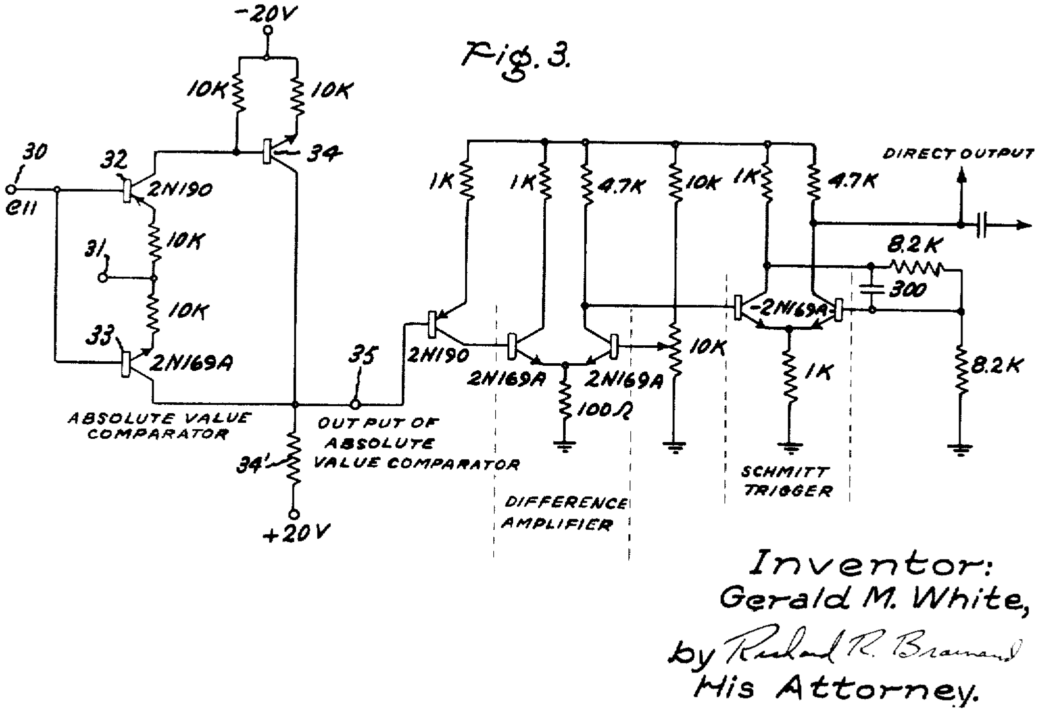
FIGURE 3 is a schematic diagram of an absolute value comparator.

There is shown, in FIGURE 3, a typical circuit which may be used as the coincidence circuit 12. This circuit produces an output when there is a desired degree of similarity between the two input waveforms. Referring particularly to FIGURE 3, one input is applied through terminal 30 and the other input is applied through terminal 31 to transistors 32 and 33. These transistors, of opposite conductivity types, produce a voltage indicative of the absolute value of the difference between the two input wave forms. An inverting transistor 34 inverts the outputs of transistor 32 so that they may be added to the outputs of transistor 33 in the summing resistor 34'. If more than two inputs are to be compared, the transistors 32 and 33 are paralleled by other transistors analogous to transistors 32 and 33. The other pairs of inputs are applied to points in the parallel branches similar to the points 30 and 31.

The output of the absolute value comparator, taken from the point 35 is indicative of the absolute value of the difference between two input wave forms but reversed in sign, or a plurality of pairs of input wave forms as the case may be. The output of the absolute value comparator is connected to differential amplifier and a Schmitt trigger which produces an output only when the output of the absolute value comparator indicates that the absolute value of the difference between the two input wave forms is below a certain minimum threshold, indicative of the fact that there is a desired degree of similarity between the input wave forms.

In addition to the circuitry shown in FIGURE 3, the coincidence circuit 12 may also be a circuit which determines the least mean square distance between the input stored in the storage register 11 and the new input. That is, such a circuit would produce an output equal to $e_{out}=\int_0^T (f_1-f_m)^2\,dt$ where $e_{out}$ is the output of the least mean square circuit, $f_1$ is the voltage stored in the storage register 11, $f_m$ is the input voltage, and T is a length of time which is long compared to the duration of the signal which the system is expected to recognize. In its simplest form, a least mean square coincidence circuit comprises a difference circuit for determining the difference between $f_1$ and $f_m$, a squaring circuit for squaring the difference and an integrator circuit for finding the time integral of the square of the difference. All of these circuits are well known in the art. Typical circuits which could be used for this purpose can be found in "Introduction to Electronic Analogue Computers," Wass, McGraw-Hill, 1955. A suitable diode squaring circuit is shown on pages 141–142 of this text and integrator circuits are shown on pages 93, 94. Difference amplifiers which are well known in the art, can be used as the difference circuit. A threshold detector which produces an output when the output of the integrator is below a certain minimum threshold completes the least mean square circuit.

It is within the scope of this invention to use other types of circuits for the coincidence circuit 12. The only requirement for such a circuit is that it produce an output indicative of the correlation, or degree of similarity, between the input waveforms.

In order to admit the signal contained in the input to the channel if a high degree of correlation is detected between the input and the contents of storage, the coincidence circuit 12 is connected to actuate a gate 13. When the gate 13 is actuated, the input, which is connected to the gate 13 from the steady state position 9, will pass through the gate to an $\alpha$ multiplier 14. In order to weight the most recently received signal contained in the input in relation to the contents of storage, the $\alpha$ multiplier multiplies the most recent signal contained in the input by a weighting factor $\alpha$. After the signal contained in the input is properly weighted, it is added to the contents of storage which is weighted in accordance with the number of times a signal contained in the input has previously been inserted into the register.

In order to determine the number of times a signal contained in the input has been inserted into the register, a counter 15 is connected to the register 11 in such a manner that the counter 15 will be advanced one count each time a new signal contained in the input is inserted into the register. This counter may be of any well known type and may, for example, comprise a number of series-connected Eccles-Jordan flip-flop circuits. The output of the counter 15 will be a quantity, designated as $Q_M$, which is indicative of the number of times a new signal contained in the input has been inserted into the register. The contents of storage is multiplied by $Q_M$ in a $Q_M$ multiplier 16. In order to provide an output from the multiplier 16 only when there is a coincidence between the contents of storage and signals contained in the input, the contents of storage is fed to the multiplier 16 through a gate 17 which is connected to be actuated by the coincidence circuit 12. When there is a coincidence between the contents of storage and a signal contained in the input, the contents of storage, multiplied by the factor $Q_M$, will be added to the signal contained in the input multiplied by the weighting factor $\alpha$ in an adder 18. In order to compensate for the multiplying factors, the output of the adder 18 is normalized in a dividing circuit 19. In this dividing circuit 19, the output of adder 18 is merely divided by the sum of $\alpha$ and $Q_M$. This effectively normalizes the input before it is inserted into the register 11. A typical dividing circuit suitable for use as the dividing circuit 19 can be found on page 265 of "System Engineering," Goode and Machol, McGraw-Hill, 1957.

For reasons which will be subsequently explained, after the priming commutator passes the steady state position 9, the rotor will again contact all of the priming positions 3, 4, 5, 6, etc., thus re-priming all of the channels. However, if, during the steady state phase of operation, a register in a particular channel has received a certain number, for example, three, of re-entered signals contained in the input, it is not necessary to re-prime that channel. In order to disconnect the channel 10, for example, from the priming position 3 when a certain number of signals contained in the input have been entered into the storage register of that channel, a relay 20 having normally closed contacts in series with the connection from the priming position 3 to the storage register is provided. The relay 20 is actuated, thus opening the contacts, when three signals contained in the input have been re-entered into the register 11. In order to detect when this certain number has been reached or exceeded, the third stage and all higher stages of the counter 15 are connected to the relay 20. The relay 20 may be of a holding type of relay, which, when once actuated, will hold the contacts in the new position until the relay is actuated in the opposite direction. After a signal contained in the input has been reinserted into the register three times, thus advancing the counter 15 by three counts, the counter 15 will actuate the relay 20 so that the contacts are opened, thus disconnecting the first channel 10 from the priming position 3. The other winding of the relay 20 is connected to an examination circuit, as will be subsequently explained in more detail, so that the relay contacts may be reclosed when it is desired to re-prime the channel 10.

For the purpose of clarity, the examination circuitry which compares information stored in two adjacent channels is separately shown in FIGURE 2. The circuitry shown will compare the contents of storage of the first channel 10 with the contents of storage of the second channel 10*a*, to determine if there is a coincidence between the two contents of storage. Circuitry similar to that shown in FIGURE 2 is connected between each set of two channels in the adaptive system. For an adaptive system having $n$ channels, the total number of examination circuits required to interconnect all channels is $(n-1)n/2$.

If a coincidence exists between the contents of storage of channel 10 and the contents of storage of channel 10*a*, the register of channel 10 will be cleared and the information stored therein reinserted in channel 10*a*. In FIGURE 2 the first register 11 and the associated counter 15 are the same as the register 11 and counter 15 of the first channel 10 shown in FIGURE 1. The storage register associated with the second channel 10*a* is designated by the numeral 21 and the associated counter is designated by the numeral 22. In order to compare the contents of storage in register 11 with the contents of storage in the register 21, a critical zone detector 23 is connected to the registers 11 and 21. The critical zone detector comprises circuitry similar to the coincidence circuit 12 of FIGURE 1. In a manner similar to the operation of the coincidence circuit 12, the critical zone detector will produce an output when the contents of storage of the registers 11 and 21 are substantially the same. When a coincidence between the contents of storage of the registers 11 and 21 is detected, the output of the critical zone detector 23 will actuate a gate 24 to which it is connected. The register 21 is also connected to the gate 24 in such a manner that when the gate 24 is actuated the output of the gate 24 will be equal to the contents of storage of the resister 21. In order to weight the contents of storage in accordance with the number of times a signal contained in the input has been reinserted in the register, the output of the gate 24 is connected to a $Q_R$ multiplier 25. The counter 22 is also connected to the $Q_R$ multiplier 25 so that the $Q_R$ multiplier 25 will multiply the input stored in the register 21 by a quantity indicative of the number of times a signal contained in the input has been reinserted in the register 21. Similarly, the critical zone detector 23 is connected to a gate 26 which, when actuated, will produce an output equal to the contents of storage of the register 11. The contents of storage of the register 11 is also multiplied, by the $Q_C$ multiplier 27, by a quantity indicative of the number of times the input has been reinserted in register 11. In order to obtain a quantity indicative of the contents of storage of both registers 11 and 21, the outputs of both the $Q_C$ multiplier 27 and the $Q_R$ multiplier 25 are added in an adder 28. In order to normalize the output of the adder 28, it is connected to a dividing circuit 29 where the output of the adder 28 is divided by the sum of $Q_C$ plus $Q_R$. The output of the dividing circuit 29 is reinserted in the second register 21.

In order to clear the register 11 when a coincidence exists between the contents of storage of the registers 11 and 21, a clear circuit 30 is connected to be actuated by the output of the critical zone detector 23. The clear circuit may be merely a relay with several sets of contacts which will be closed momentarily when the clear circuit 30 is actuated by the critical zone detector 23. If the storage register 11 includes a storage capacitor, it may be cleared quite easily by discharging it to ground through a set of contacts which momentarily close. This same set of contacts may also be connected to all stages of the counter 15 so that all stages will be driven to the zero condition when the clear circuit 30 is actuated.

In order to condition the first channel 10 for the reception of new inputs during the next priming phase, the clear circuit 30 is also connected to the relay 20 shown in FIGURE 1 in such a manner that when the clear circuit 30 is actuated, the relay 20 will be actuated so as to close the contacts, thus re-making the connection between the priming position 3 and the first register 11. This may be accomplished by connecting a suitable voltage source through a set of contacts of the relay in the clear circuit to the winding of the holding relay 20 so that the contacts of the holding relay 20 will be closed when the clear circuit is actuated.

The operation of my adaptive system in recognizing and storing a plurality of signals contained in an input can be described briefly as follows. During the priming phase, a portion of the input is randomly inserted into each channel through the priming positions of the commutator 1. There is a random posibility that one or more of the channels may receive a portion of the input which contains one of the signals which is being repeated. The remainder of the channels will receive a portion of the input which merely contains noise. For the purposes of this discussion, it will be assumed that the first channel 10 has received a particular signal which occurs repetitively. As the rotor 2 of the priming commutator 1 passes from the priming positions to the steady state position 9, the steady state phase of operation begins. This phase of operation is quite long in time compared with the priming phase of operation; that is, the rotor 2 remains on the steady state position 9 much longer than it remains on the priming positions. If the signal which was initially fed to the first channel 10 and stored in the storage register 11 is repeated, the coincidence circuit 12 will detect a coincidence between the signal contained in the input and contents of storage of the register 11. The coincidence circuit 12 will actuate the gate 13, thus allowing the signal contained in the input to pass the gate 13. The signal contained in the input will be multiplied by the weighting factor $\alpha$ in the $\alpha$ multiplier 14 and thence fed to the adder 18. When a coincidence is detected, the coincidence circuit 12 will also activate the gate 17, thus allowing the contents of storage of the register 11 to pass through the gate 17. The output of the gate 17 is multiplied in the $Q_M$ multiplier 16, by the quantity $Q_M=1$, indicative of the fact that only one input has previously been inserted in the first register 11. The output of the $Q_M$ multiplier 16 is connected to the adder 18 so that the output of the adder 18 is the sum of the signal contained in the input multiplied by $\alpha$ plus the contents of storage multiplied by $Q_M$. This sum is normalized in the dividing circuit 19 and reinserted into the first register 11. Each time that this particular signal occurs during the steady state phase, the signal contained in the input will be reinserted into the first storage register 11. The reinserted signal will be weighted by a weighting factor $\alpha$ in favor of the most recent occurrence of the signal and will be weighted by a factor $Q_M$ in favor of the number of times the signal has been reinserted into the register. The $\alpha$ weighting factor introduces forgetting into the operation of the channel so that if the signal is changing slightly with each repetition, the channel will adapt itself to the new signal. The reinsertion into the storage register 11 of inputs containing the repetitive signal will have the effect of averaging out the noise which is present so that the contents of storage will become indicative of the signal only, without noise, after a number of reinsertions. The contents of storage of each channel more clearly defines the signal being recognized as more and more reinsertions are made.

After the signal has been inserted into the register three times, thus advancing the counter 15 by three counts, the counter 15 will actuate the relay 20 so that the contacts are opened, thus disconnecting the first channel 10 from the priming position 3. During the next priming phase, the first channel 10 will not be reprimed.

During the next priming phase, the channels which have not recognized a signal will be randomly reprimed again. The channels which receive a signal which is being repeated will then begin a recognition process as described above in conjunction with the first channel. It is quite possible that during the priming phase, two or more channels will be primed with the same signal. In such a case, all of the channels primed with the same signal will begin recognizing and storing this signal. In order to transfer this signal to one single channel and to clear the other channels so that they will be receptive to another signal, examination circuitry which interconnects all channels is provided.

The examination circuit interconnecting the first and second channels is shown in FIGURE 2. If, for example, the storage register 11 of the first channel and the storage register 21 of the second channel are recognizing the same signal, the critical zone detector 23 will actuate the gates 24 and 26. In the form shown, the contents of storage are reinserted in the register 21, which may be conveniently referred to as the receiving register, and the first register 11, which may be conveniently referred to as the cleared register, is cleared. However, it should be understood that each register will serve as a cleared register and as a receiving register, depending upon the connections of the various examination circuits.

When the critical zone detector 23 detects a coincidence between the contents of storage of the register 11 and the register 21, it will actuate the gates 24 and 26. These gates will pass the stored inputs to the $Q_C$ multiplier 27 and the $Q_R$ multiplier 25, where the inputs will be weighted in favor of the number of times the signal contained in the input has been re-entered into each register. The weighted contents of storage are added in the adder 28 and normalized in the dividing circuit 29, from which the contents of storage are reinserted into the receiving register 21. When a coincidence occurs, the critical zone detector 23 will also actuate the clear circuit 30. The clear circuit 30 will clear the first register 11 and the associated counter 15 and actuate the relay 20 so that the priming position 3 is reconnected to the storage register 11 through the contacts of that relay. The register 11 is then in condition to be reprimed to attempt a recognition of a different signal.

While the operation of the examination circuitry has been described as a separate phase of the operation of my adaptive system, it should be understood that the examination phase may take place concurrently with the priming and steady state phases. The examination phase is a continuous process of comparing and reinserting the inputs stored in the various channels.

While the system has been described in conjunction with a priming commutator and examination circuitry, it should be understood that these are not absolutely necessary to the operation of my system. The priming commutator could be eliminated and the input directly connected to all of the channels in parallel if provision is made for starting the channels on the recognition process at different times so that they would not all recognize the same signal. Similarly, the examination circuitry could be eliminated and although the operation would not be at an optimum, the channels would still recognize the different signals contained in the input.

Figure 4:
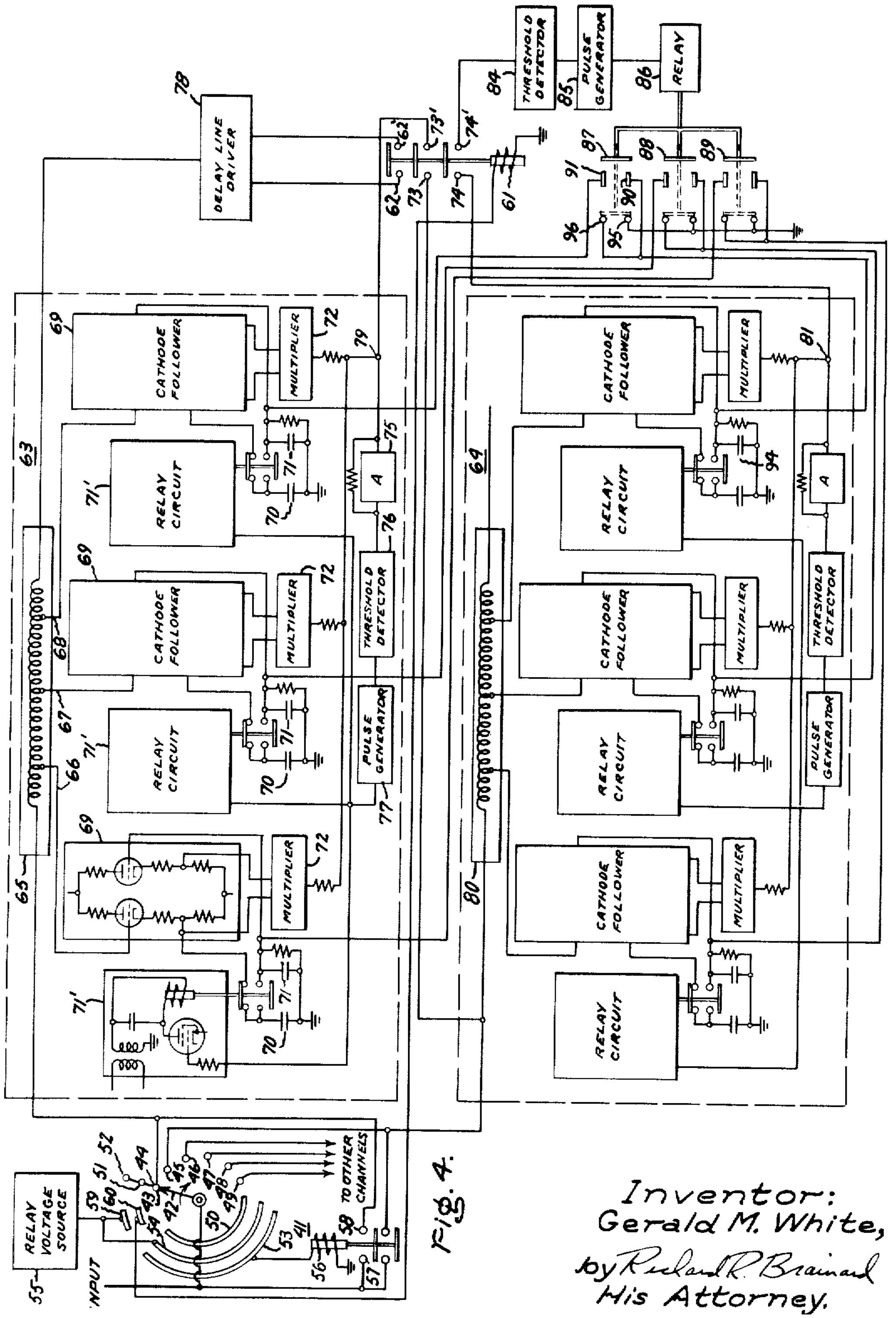
FIGURE 4 is a diagram of another embodiment of the adaptive system of this invention.

Another embodiment of the subject invention is shown in FIGURE 4. The specific arrangement of FIGURE 4 comprises a plurality of adaptive channels of the type described and claimed in United States patent application of Charles V. Jakowatz, filed concurrently herewith (docket 15D–1942), entitled, "Adaptive Filter" and to which the present invention is generic. The specific adaptive filters which make up each channel of the system of FIGURE 4 are the invention of the said Charles Jakowatz.

Referring particularly to FIGURE 4, the input containing the plurality of signals and possible noise is fed to a priming commutator 41, which is shown as being of the mechanical type. As in the previous embodiment, this commutator performs the function of priming the various channels and of switching from the priming phase to the steady state phase of operation. In addition, the commutator 41 performs the function of switching the system to the examination phase which, in this embodiment, occurs at a different time than the priming and steady state phases. The input is connected to a rotor 42 of the commutator 41. The contact 43 of the rotor 42 rotates continuously, thus successively connecting the input to priming positions 44, 45, 46, 47, 48 and 49 and to a steady state position 50. Thus, during the priming phase, the priming commutator 41 feeds the inputs successively to each of the channels and during the steady state phase the input is connected to all channels simultaneously.

During the steady state phase of operation, two contacts 51 and 52 on the commutator rotor 42 provide a connection between stationary contacts 53 and 54, thus connecting a source of relay voltage 55 to the winding of a relay 56. The relay 56 has two contacts 57 and 58 which, when closed by the relay contactor, complete a circuit between the input and all channels of the system connected in parallel. Thus, during the steady state phase of operation, the input signal is fed through the contacts 57 and 58 to all of the channels.

During the examination phase of operation of the system, the contacts 51 and 52 on the commutator rotor 42 provide a direct connection between stationary contacts 59 and 60, thus completing a connection between the source of relay voltage 55 and the winding on a relay 61. The relay 61 actuates three sets of relay contacts which, when closed, actuate circuity which is essential to the examination phase of operation of the system, as will be subsequently explained.

As previously mentioned, during the priming phase of operation, the commutator 41 momentarily connects the input through the commutator contact 44 to an adaptive channel 63 and through the commutator contact 45 to an adaptive channel 64. Similarly, the contacts 47, 48 and 49 momentarily connect the input to other adaptive channels not shown in detail in FIGURE 4. The operation of each of the individual channels 63 and 64 is described in detail in the above-mentioned copending Jakowatz application. Briefly, the input is connected to a delay line 65 in adaptive channel 63 which is provided with a number of taps 66, 67 and 68. The voltages from these taps are connected through cathode followers 69 to sampling capacitors 70. The sampling capacitors 70 are periodically connected to storage capacitors 71 by relay circuits 71' which are actuated in response to the detection of a signal in the input which has a high correlation to the signal already stored on the storage capacitors 71. The voltages on the storage capacitors 71 are connected through the cathode followers 69 to multipliers 72. The sum of the outputs of these multipliers forms the cross-correlation factor between the stored voltages and the sampled voltages. The outputs of these multipliers 72 are connected through an amplifier 75 to a threshold detector 76 and thence to a pulse generator 77. The threshold detector 76 and pulse generator 77 produce an output upon the occurrence of a high correlation between the stored and sampled voltages. Upon this occurrence, the pulse generator 77 actuates all of the relay circuits 71', thus closing the contacts of the relays and placing the sampled voltages on the sampling capacitors 70 into storage on the storage capacitors 71.

The adaptive filter of channel 64 comprises circuitry similar to that of the circuitry in channel 63. In order to compare the information contained in the two channels 63 and 64 during the examination stage to determine if these two channels are recognizing and storing the same signal, a delay line driver 78 is provided to periodically pulse the delay line 65 to read out the information contained in storage in the channel 63. The delay line driver 78 produces a sharp spike pulse output when contacts 62–62' of the relay 61 are closed. The relay 61 is, as previously mentioned, actuated when the priming commutator 41 passes into the examination stage, thus connecting the source of relay voltage 55 through the contacts 59 and 60 to the relay 61.

Upon the occurrence of the sharp spike output from the delay line driver 78, the information contained in the storage capacitors 71 of the channel 63 are read out. The sum of the voltages indicating this information appears as an output voltage at the point 79. Time-wise, the voltage waveform appearing at the point 79 is the inverse of the voltages appearing across the storage capacitors 71. That is, the waveform appearing at the point 79 is indicative first of the voltage stored on the storage capacitor 71 at the extreme right in channel 63, the voltage across the middle storage capacitor 71 appears next in time, and the voltage across the storage capacitor 71 at the extreme left appears next in time in this waveform. This waveform is connected through contacts 73–73' of the relay 61, which contacts are closed as a result of the priming commutator 41 passing through the examination or recognition stage. After passing through the contacts 73–73', the waveform is inserted into the input end of delay line 80 in channel 64.

When the waveform from the point 79 is fed into the front end of the delay line 80 in channel 64, the summation of the outputs of the multipliers in channel 64 is indicative of the correlation between the voltages stored on the storage capacitors of the channel 63 and the voltages stored on the storage capacitors of the channel 64. The voltage at point 81 in channel 64 is indicative of this correlation. The voltage at the point 81 is connected through contacts 74–74' of relay 61, which contacts are closed as a result of the priming commutator 41 passing through the examination stage. Upon passing through the contacts 74–74', the correlation function between the two channels is connected to a threshold detector 84 which will produce an output only when the correlation between the contents of storage of the two channels is above a predetermined minimum level. Upon the occurrence of such a high correlation function, indicative of the fact that the channels 63 and 64 are recognizing and storing the same signal, the threshold detector 84 produces an output which actuates a pulse generator 85, which in turn actuates a relay 86. The relay 86 drives the relay contacts 87, 88 and 89 toward the left, as shown schematically in the drawing. This set of relay contacts is provided to initially connect each of the storage capacitors in channel 63 to the corresponding one of the storage capacitors in channel 64 and then to short the storage capacitors in channel 64 to ground. These two events have the effect of first averaging the contents of storage of channels 63 and 64 and placing the contents of storage into the channel 63. Secondly, they have the effect of clearing channel 64 of all information, thus making the channel available for the recognition of another signal during the next priming and steady state phases. As an example, the contactor 87, upon being driven to the left by the relay 86, first connects contacts 90 and 91. The contact 90 is connected to storage capacitor 94, that is, the one at the extreme right of channel 64. The contact 91 is connected to the storage capacitor 71 at the extreme right of channel 63. Therefore, when the contactor 87 passes over the contacts 90 and 91, these two storage capacitors are momentarily connected together, thus averaging the voltages on the two capacitors. Upon further movement to the left, the contactor 87 connects contacts 95 and 96. The connection of these two contacts has the effect of shorting the storage capacitor 94 at the extreme right of channel 64 to ground. Similarly, the contactors 88 and 89 perform the same function for the remainder of the storage capacitors in the channels 63 and 64. After a momentary interval, the relay 86 turns to its normal position, that is, as shown in FIGURE 4. After being actuated, the relay 86 has performed the function of inserting the contents of storage of channel 64 into storage in channel 63 and of clearing channel 64 of all information, thus making it available for the recognition and storage of another signal.

The operation of the adaptive system of FIGURE 4 in recognizing and classifying a plurality of signals is as follows. During the priming phase of operation, the rotor 42 of the commutator 41 successively connects the input for a momentary time interval to each of the channels, two of which, 63 and 64, are shown. During this momentary time interval, a random sample of the input is inserted into storage in each of the channels.

While the priming contacts of the commutator 41 are not shown directly connected to the storage capacitors in each channel, it should be recognized that during the priming phase, the input should be placed on the storage capacitors. If the initial level of the threshold detector is low enough, the first sample will be transferred to the storage capacitor 71. If not, the pulse generator 77 may be manually operated to make the transfer from sampling capacitors 70 to storage capacitors 71. If, during this momentary interval a signal is inserted into storage in a particular channel, the channel will begin recognition of this signal during the steady state phase of operation. This phase of operation begins when the rotor 42 of the commutator 41 reaches the contact 50 of the commutator and this phase of operation continues during the time in which the rotor 42 is in contact with the contact 50. During this time, each channel begins recognition of the signal randomly inserted into the storage in a manner best described in the copending application of Charles V. Jakowatz previously mentioned. Upon each recurrence of a particular signal, the channel storing that signal achieves a better definition of the stored signal, as indicated by the voltages on the storage capacitors in that channel.

During the recognition phase of the operation of this system, the information stored in two adjacent channels is compared to determine if both channels are recognizing the same signal. If both channels are recognizing the same signal, the contents of storage of the two channels are averaged and placed in storage in one of the channels while the other channel is cleared of information.

The recognition phase of operation begins when the rotor 42 of the commutator 41 passes to the position such that the contacts 51 and 52 mounted on the rotor 42 make contact with the stationary contacts 59 and 60. Upon such occurrence, the relay voltage 55 is applied to the relay 61 so that all contacts of the relay 61 are closed. These three sets of contacts are closed almost simultaneously but the closing of the contacts is in such an order that the following sequence of events occurs: First, the set of contacts 62–62' is closed so that the delay line driver 78 is energized, thus producing a sharp spike pulse which is fed to the right end of delay line 65 in channel 63, thereby reading out the information stored in channel 63. Secondly, the set of contacts 73–73' is closed, thereby connecting the correlation function produced by this reading out to the input to delay line 80 in channel 64. Third, the set of contacts 74–74' is closed, thereby connecting the voltage indicative of the correlation between the information stored in channels 63 and 64, taken from the point 81 in channel 64, to the threshold detector 84.

If this correlation exceeds a certain predetermined value, the threshold detector 84 actuates pulse generator 85, which, in turn, actuates relay 86. In such case, the contactors 87, 88 and 89 of relay 86 move to the left, thus initially transferring the contents of storage of channel 64 to channel 63 and thereafter shorting out the storage capacitors in channel 64, thus clearing this channel and making it available for the recognition and storage of a new signal upon the occurrence of the next priming and recognition phases.

What has been described is an adaptive system which will recognize and store a plurality of different signals which occur repetitively. While certain specific embodiments of my invention have been shown and described, it will, of course, be understood that various other modifications may be made without departing from the principles of the invention. The appended claims are therefore intended to cover any such modifications within the true spirit and scope of the invention.

What I claim as new and desire to secure by Letters Patent of the United States is:

1. An adaptive system for recognizing and storing a plurality of time-spaced signals contained in an input comprising a plurality of adaptive channels connected in parallel, means for feeding said input to all of said adaptive channels and comparison means responsive to the reception of a repeated signal by any one of said channels for conditioning said channel to recognize and store repeated receptions of said signal by adding a proportion of said signal to storage in said channel.

2. An adaptive system for recognizing and storing a plurality of time-spaced signals contained in an input, said input also containing noise, said system comprising a plurality of channels each having storage means for storing any particular one of the plurality of signals contained in the input, priming means for initially successively connecting the input to the storage means in each channel for a momentary time interval, the initial contents of storage in each channel being the particular signal or noise which occurs during said momentary time interval, means for comparing the input with the contents of storage in each channel, and gating means responsive to said last-named means for inserting signals corresponding to the contents of storage of a channel into the storage means of that channel.

3. An adaptive system for classifying a plurality of time-spaced signals contained in an input in accordance with the degree of correlation between successively received signals comprising a plurality of channels each having storage means, priming means for initially successively connecting the input to the storage means in each channel for a momentary time interval, the initial contents of storage in each channel being the particular signal which occurs during said momentary time interval, means for comparing the input with the contents of storage in each channel, and gating means responsive to said last-named means for inserting signals having a desired degree of correlation to the contents of storage of a channel into the storage means of that channel whereby these signals are classified into different channels in accordance with the degree of correlation between successively received signals.

4. The adaptive system recited in claim 3 and examination means for comparing the contents of storage of all channels, and means responsive to said examination means for transferring all contents of storage having a high degree of correlation to one of the storage means containing the highly correlated contents of storage.

5. An adaptive system for recognizing and storing a plurality of time-spaced signals contained in an input, said input also containing noise, said system comprising a plurality of channels each having storage means for storing any particular one of the plurality of signals contained in the input, priming means for initially successively connecting the input to the storage means in each channel for a momentary time interval, the initial contents of storage in each channel being the particular signal or noise which occurs during the momentary time interval, means for comparing the input with the contents of storage in each channel, gating means responsive to said last-named means for inserting signals corresponding to the contents of storage of a channel into the storage means of that channel, examination means for comparing the contents of storage of all channels, and means responsive to said examination means for transferring all similar contents of storage to one of the storage means containing the similar contents of storage.

6. An adaptive system for recognizing and storing a plurality of time-spaced signals contained in an input, said input also containing noise, said system comprising a plurality of adaptive channels connected in parallel, means for feeding said input to all of said adaptive channels, means responsive to the reception of a signal by any one of said channels for conditioning said channel to recognize and store repeated receptions of said signals, examination means for comparing the contents of storage of all channels and means responsive to said examination means for transferring all similar contents of storage to one of the channels containing the similar contents of storage.

7. An adaptive system for recognizing and storing a plurality of time-spaced signals contained in an input, said input also containing noise, said system comprising a plurality of adaptive channels connected in parallel, means for feeding said input to all of said adaptive channels, means responsive to the reception of a signal by any one of said channels for conditioning said channel to recognize and store repeated receptions of said signals, examination means for comparing the contents of storage of all channels, means responsive to said examination means for transferring all similar contents of storage to one of the channels containing the similar contents of storage and means for clearing the contents of storage from the other channels containing the similar contents of storage.

8. An adaptive system for recognizing and storing a plurality of time-spaced signals contained in an input, said input also containing noise, said system comprising a plurality of channels each having a storage register for storing any particular one of the plurality of signals contained in the input, priming means for initially successively connecting the input to the storage register in each channel for a momentary time interval, the initial contents of the storage register in each channel being the particular signal or noise which occurs during said momentary time interval, each channel further comprising a coincidence circuit, the storage register in each channel being connected to the coincidence circuit in that channel and said input being connected to the coincidence circuit, said coincidence circuit producing an output when there is a coincidence between a particular signal contained in the input and the contents of storage of that channel, and gating means responsive to the coincidence circuit for inserting signals corresponding to the contents of storage of a channel into the storage register of that channel.

9. An adaptive system as recited in claim 8 wherein said coincidence circuit is an absolute value comparator comprising two complementary transistors, said input being applied to the bases of both of said transistors, the emitters of said transistors being connected together and to the contents of storage of the channel, a third transistor, the collectors of said first two transistors being connected to said third transistor whereby the output of said third transistor is indicative of the absolute value of the correlation between the input and the contents of storage of that channel.

10. An adaptive system for recognizing and storing a plurality of time-spaced signals contained in an input, said input also containing noise, said system comprising a plurality of channels each having a storage register for storing any particular one of the plurality of signals contained in the input, priming means for initially successively connecting the input to the storage register in each channel for a momentary time interval, the initial contents of the storage register in each channel being the particular signal or noise which occurs during said momentary time interval, each channel further comprising a least mean square coincidence circuit, the storage register in each channel and said input being connected to the coincidence circuit in that channel, said coincidence circuit producing an output only when there is a coincidence between a particular signal contained in the input and the contents of storage of that channel, and gating means responsive to the output of said coincidence circuit for inserting signals corresponding to the contents of storage of a channel into the storage register of that channel.

11. A system as recited in claim 10 wherein the least means square coincidence circuit comprises a difference circuit, said storage register and said input being connected to said difference circuit, the output of said difference circuit being the difference between the contents of storage and the input, a squaring circuit, said difference circuit being connected to said squaring circuit, the output of said squaring circuit being the square of said difference, an integrator circuit, said squaring circuit being connected to said integrator circuit, the output of said integrator circuit being the time integral of said squared difference, a threshold detector connected to the output of said integrator, said threshold detector producing an output only when the output of said integrator reaches a peak, the output of said threshold detector being the output of said least mean square coincidence circuit.

12. An adaptive system for recognizing and storing a plurality of time-spaced signals contained in an input, said input also containing noise, said system comprising a plurality of channels each having a storage register for storing any particular one of the plurality of signals contained in the input, priming means for successively connecting the input to the storage register in each channel for a momentary time interval, the contents of the storage register in each channel being the particular signal or noise which occurs during said momentary time interval, each channel further comprising a coincidence circuit, said input and said storage register being connnected to said coincidence circuit, said coincidence circuit producing an output only at a time when there is a substantial coincidence between the contents of storage of the storage register in that channel and the particular signal contained in the input, a first gate, the output of said coincidence circuit and said input being connected to said first gate, the output of said gate being equal to said particular signal, an $\alpha$ multiplier circuit, the output of said gate being connected to said $\alpha$ multiplier circuit, the output of said $\alpha$ multiplier circuit being equal to said particular signal multiplied by a weighting factor, $\alpha$, a second gate, said storage register and said coincidence circuit being connected to said second gate, the output of said second gate being equal to the contents of storage, a counter connected to said storage register, said counter being advanced one count each time said particular signal is inserted into said storage register, a $Q_M$ multiplier circuit connected to the output of said second gate and to the output of said counter for multiplying the contents of storage by a quantity, $Q_M$, indicative of the number of times the particular signal has been inserted into said storage register, an adder, said $\alpha$ multiplier and said $Q_M$ mulitplier being connected to said adder, the output of said adder being equal to the sum of said particular signal multiplied by $\alpha$ plus the contents of storage multiplied by $Q_M$, a dividing circuit, the output of said adder, the output of said counter, and said weighting factor, $\alpha$, being connected to said dividing circuit, the output of said dividing circuit being the normalized value of the output of said adder, the output of said dividing circuit being connected to said storage register whereby a quantity indicative of said particular signal and said contents of storage is inserted into said storage register.

13. The system of claim 12 wherein the priming means comprise a commutator having $n$ priming positions and one steady state position, said input being connected to said commutator, said commutator having alternate priming phases and steady state phases, said commutator being adapted to selectively connect said input to each of said $n$ priming positions for a momentary time interval during said priming phase and to said steady state position during said steady state phase for a time interval quite long in relation to the momentary time interval, $n$ normally closed holding relays, each of said $n$ priming positions being connected through the contacts of one of said normally closed relays to one of the storage registers so that said input is successively connected directly to each of said storage registers during said priming phase, each of said counters being connected to a corresponding one of said normally closed holding relays so that said normally closed relay is opened when the corresponding counter is advanced a predetermined number of counts.

14. The system of claim 13 in combination with $(n-1)n/2$ examination circuits, each of said examination circuits being connected between two channels whereby the storage register of one channel serves as a cleared register and the storage register of the other channel serves as a receiving register, each examination circuit comprising a critical zone detector, said cleared register and said receiving register being connected to said critical zone detector, said critical zone detector producing an output only when the contents of storage o fthe cleared register is the same as the contents of storage of the receiving register, a third gate, said critical zone detector and said cleared register being connected to said third gate, the output of said third gate being equal to the contents of storage of said cleared register, a $Q_C$ multiplier, the counter associated with said cleared register and the output of said third gate being connected to said $Q_C$ multiplier, the output of said $Q_C$, multiplier being equal to the contents of storage of said cleared register multiplied by a quantity, $Q_C$, indicative of the number of times the particular signal has been inserted into said cleared register, a fourth gate, said critical zone detector and said receiving register being connected to said fourth gate, the output of said fourth gate being equal to the contents of storage of said receiving register, a $Q_R$ multiplier, the counter associated with the receiving register and the output of said fourth gate being connected to said $Q_R$ multiplier, the output of said $Q_R$ multiplier being equal to the contents of storage of said receiving register multiplied by a quantity, $Q_R$, indicative of the number of times the particular signal has been inserted into said receiving storage register, a second adder, the output of said $Q_C$ multiplier and the output of said $Q_R$ multiplier being connected to said adder, the ouput of said adder being equal to the sum of the contents of storage of said cleared register multiplied by $Q_C$ plus the contents of storage of said receiving register multiplied by $Q_R$, a second dividing circuit, the ouput of said second adder being connected to said dividing circuit, the output of the counter associated with said cleared register and the output of the counter associated with said receiving register being connected to said dividing circuit, the output of said dividing circuit being the normalized value of the output of said adder, the output of said second dividing circuit being connected to said receiving register whereby a quantity indicative of the contents of storage of both the cleared and the receiving register is inserted into the receiving register, a clear circuit connected to be actuated by the output of said critical zone detector, said clear circuit being connected to the counter associated with said cleared register so as to drive said counter to zero count when said clear circuit is actuated, said clear circuit being connected to the normally closed holding relay so as to close said relay when said clear circuit is actuated whereby a new portion of the input may be inserted into the cleared register during the next priming phase.

15. An adaptive system for recognizing and storing a plurality of time-spaced signals contained in an input comprising a plurality of channels each having storage means for storing any particular one of the plurality of signals contained in the input, priming means for initially successively connecting the input to the storage means in each channel for a momentary time interval, the initial contents of storage in each channel being the particular signal or noise which occurs during the momentary time interal, means for comparing the input with the contents of storage in each channel, gating means responsive to said last-named means for inserting signals corresponding to the contents of storage of a channel into the storage means of that channel, examination circuitry for comparing the contents of storage of all channels, said examination circuitry including means for reading out the contents of storage of a first channel, means for producing a voltage indicative of the correlation between the read-out contents of storage and the contents of storage of a second channel, threshold detector, said correlation voltage being connected to said threshold detector, said threshold detector producing an output when said correlation voltage is in excess of a desired level, and means responsive to said threshold detector for transferring the contents of storage of said second channel to said first channel and for clearing the contents of storage of said second channel.

16. An adaptive system for recognizing and storing a plurality of time-spaced signals contained in an input comprising a plurality of channels each having storage means for storing any particular one of the plurality of signals contained in the input, priming means for initially successively connecting the input to the storage means in each channel for a momentary time interval, the initial contents of storage in each channel being the particular signal or noise which occurs during the momentary time interval, means for comparing the input with the contents of storage in each channel, gating means responsive to said last-named means for inserting signals corresponding to the contents of storage of a channel into the storage means of that channel, examination circuitry for comparing the contents of storage of all channels, said examination circuitry including means for reading out the contents of storage of a first channel, means for producing a voltage indicative of the correlation between the read-out contents of storage and the contents of storage of a second channel, a threshold detector, said correlation voltage being connected to said threshold detector, said threshold detector producing an output only when said correlation voltage is indicative of a high degree of similarity between the contents of storage of said first and said second channels, and connection means actuated in response to the output of said threshold detector, said connection means first connecting the storage means in said second channel to the storage means in said first channel and secondly connecting said storage means in said second channel to ground.

17. An adaptive system for storing a signal having successively greater coincidence with a received signal contained in an input including noise or another signal comprising storage means, means placing at least a portion of input in storage for a predetermined interval of time, means measuring the degree of coincidence between the contents of storage and said input during succeeding intervals of time and means adding at least a proportion of said input to storage only when the measured degree of coincidence is greater than a predetermined amount.

18. An adaptive system for storing in separate channels different signals, each having successively greater coincidence with one of the signals contained in an input including a plurality of signals comprising a plurality of channels each including storage means, means placing the input during successive intervals in the storage means of different channels, coincidence measuring means in each channel for measuring the coincidence between the incoming signal and the contents of storage of each channel and means adding at least a proportion of the incoming signal to the contents of storage of one of said channels when the measured coincidence exceeds a predetermined value.

19. Apparatus for significant signal recognition comprising input means, memory means for storing a standard signal, means for comparing an input from said input means with the stored standard, and means for successively combining with said stored standard quantities proportioned to portions of input which compare favorably with said standard within a preselected variation, in order to improve in storage a representation of a repetitive signal contained in the input while tending to ignore the value of random noise because of failure of successively favorable comparison thereof with the stored standard.

20. Apparatus for significant signal recognition comprising input means, memory means for storing a signal taken from input, comparison means for comparing further input from said input means with the stored signal, and combining means for successively electrically averaging with said stored signal further signal quantities proportioned to the successive portions of input which compare favorably with said stored signal over a plurality of favorable comparisons, in order to improve in storage a representation of a repetitive signal contained in the input while tending to ignore the value of random noise because of failure of successively favorable comparison thereof.

21. Apparatus for significant signal recognition comprising input means, memory means for storing a signal, correlation means for comparing an input from said input means with the stored signal, and combining means for successively averaging, with said stored signal, quantities proportioned to the portions of input which compare favorably with said stored signal over a plurality of favorable comparisons including means for weighting the average in favor of the latest portion of input which compared favorably in order to improve in storage a representation of a repetitive signal contained in the input while facilitating change in the signal stored by virtue of giving newly acquired comparisons greater weight in the average.

22. Apparatus for deriving a repetitive signal from an input comprising: input signal coupling means; storage for retaining a plurality of elementary indications representative of a particular signal; comparison means between said storage and said input signal coupling means for detecting a degree of coincidence between a series of elementary indications in said input signal and ones of a corresponding series of elementary indications in said storage; and means responsive to the detection of said coincidence for combining with storage, proportional values corresponding to the like elementary indications in the input.

References Cited by the Examiner

UNITED STATES PATENTS

| | | | |
|---|---|---|---|
| 2,696,891 | 12/1954 | Neufeld | 340—172.5 X |
| 2,897,477 | 7/1959 | Lindsey | 340—15 |

OTHER REFERENCES

Pages 2–1 to 2–270, 1959, Publication I: Handbook of Automation Computation and Control, vol. II, by Grabbe, Ramo and Wooldridge, John Wiley & Sons.

Pages 145 to 151, April 1953, Publication II: The Share 709 System, Programmed Input-Output Buffering by Mock and Swift, Journal of the Association for Computing Machinery, vol. VI, No. 2.

ROBERT C. BAILEY, *Primary Examiner.*

EVERETT R. REYNOLDS, IRVING L. SRAGOW, MALCOLM A. MORRISON, *Examiners.*